(12) United States Patent
Wang et al.

(10) Patent No.: US 10,633,047 B2
(45) Date of Patent: Apr. 28, 2020

(54) DAMPER OF SEMI-ACTIVE ENERGY REGENERATIVE SUSPENSION BASED ON HYBRID EXCITATION AND ITS SIZE DETERMINATION METHOD

(71) Applicant: JIANGSU UNIVERSITY, Jiangsu (CN)

(72) Inventors: Ruochen Wang, Jiangsu (CN); Wei Yu, Jiangsu (CN); Renkai Ding, Jiangsu (CN); Long Chen, Jiangsu (CN); Jiajia Wang, Jiangsu (CN)

(73) Assignee: JIANGSU UNIVERSITY (CN)

( * ) Notice: Subject to any disclaimer, the term of this patent is extended or adjusted under 35 U.S.C. 154(b) by 0 days.

(21) Appl. No.: 15/739,086

(22) PCT Filed: Aug. 26, 2016

(86) PCT No.: PCT/CN2016/096842
§ 371 (c)(1),
(2) Date: Dec. 21, 2017

(87) PCT Pub. No.: WO2018/032528
PCT Pub. Date: Feb. 22, 2018

(65) Prior Publication Data
US 2019/0185083 A1   Jun. 20, 2019

(30) Foreign Application Priority Data
Aug. 16, 2016   (CN) .......................... 2016 1 0678123

(51) Int. Cl.
*G06G 7/48* (2006.01)
*B62D 65/00* (2006.01)
(Continued)

(52) U.S. Cl.
CPC ............. *B62D 65/00* (2013.01); *B60G 13/08* (2013.01); *B60G 13/14* (2013.01); *F16F 6/00* (2013.01);
(Continued)

(58) Field of Classification Search
None
See application file for complete search history.

(56) References Cited

U.S. PATENT DOCUMENTS 5,000,478 A  *  3/1991  Kerastas ............ B60G 17/0152
                                                      188/266.7
5,251,729 A      10/1993  Nehl et al. ..................... 188/299
(Continued)

FOREIGN PATENT DOCUMENTS

CN   103161870   6/2013   ................ F16F 9/34
CN   103192673   7/2013   ............. B60G 13/18
(Continued)

OTHER PUBLICATIONS

International Search Report (w/translation) and Written Opinion (no translation)issued in application No. PCT/CN2016/096842, dated May 8, 2017 (9 pgs).

*Primary Examiner* — Rehana Perveen
*Assistant Examiner* — Nithya J. Moll
(74) *Attorney, Agent, or Firm* — Hayes Soloway P.C.

(57) ABSTRACT

Provided is a damper for a semi-active energy regenerative suspension based on hybrid excitation. The damper includes: an upper lifting lug, a dustcover, a lower lifting lug, a hydraulic shock absorber, and a hybrid excitation mechanism, wherein the hydraulic shock absorber is configured to provide a constant viscous damping coefficient, and wherein the hybrid excitation mechanism is configured to generate an adjustable electromagnetic damping force, to transform the vibration energy into electrical energy, and to
(Continued)

storage the electrical energy. Also provided is a method for determining the sizes of the damper. The damper which has a simple structure, balances the vibration isolation property and energy regenerative property of the vehicle suspension, and provides a fail-safe function. Furthermore, the method for determining the sizes of the damper is easy and practical to implement, has definite steps and produces drastically optimized results.

5 Claims, 3 Drawing Sheets

(51) Int. Cl.
| | |
|---|---|
| *F16F 9/34* | (2006.01) |
| *G06F 30/15* | (2020.01) |
| *G06F 30/20* | (2020.01) |
| *B60G 13/08* | (2006.01) |
| *B60G 13/14* | (2006.01) |
| *F16F 6/00* | (2006.01) |
| *F16F 9/19* | (2006.01) |
| *F16F 9/36* | (2006.01) |
| *F16F 9/54* | (2006.01) |
| *F16F 15/03* | (2006.01) |
| *H02K 5/24* | (2006.01) |
| *H02K 41/03* | (2006.01) |
| *G06F 111/10* | (2020.01) |

(52) U.S. Cl.
CPC ............... *F16F 9/19* (2013.01); *F16F 9/34* (2013.01); *F16F 9/362* (2013.01); *F16F 9/54* (2013.01); *F16F 15/03* (2013.01); *G06F 30/15* (2020.01); *G06F 30/20* (2020.01); *H02K 5/24* (2013.01); *H02K 41/033* (2013.01); *B60G 2202/25* (2013.01); *B60G 2204/128* (2013.01); *B60G 2204/129* (2013.01); *B60G 2206/41* (2013.01); *B60G 2206/8201* (2013.01); *B60G 2500/10* (2013.01); *B60G 2800/162* (2013.01); *F16F 2222/06* (2013.01); *F16F 2222/12* (2013.01); *F16F 2224/02* (2013.01); *F16F 2226/048* (2013.01); *F16F 2228/066* (2013.01); *F16F 2230/0023* (2013.01); *G06F 2111/10* (2020.01); *H02K 2213/06* (2013.01)

(56) References Cited

U.S. PATENT DOCUMENTS

| | | | |
|---|---|---|---|
| 6,053,291 A | 4/2000 | Shibahata et al. | 188/271 |
| 6,279,701 B1 | 8/2001 | Namuduri et al. | 188/267.2 |
| 6,694,856 B1 * | 2/2004 | Chen | F16F 9/535 |
| | | | 89/43.01 |
| 9,062,734 B2 * | 6/2015 | Yamashita | F16F 9/5126 |
| 2008/0246200 A1 * | 10/2008 | Varvoordeldonk | F16F 15/02 |
| | | | 267/140.14 |
| 2015/0171674 A1 * | 6/2015 | Lee | H02K 1/246 |
| | | | 318/724 |

FOREIGN PATENT DOCUMENTS

| | | | |
|---|---|---|---|
| CN | 104930112 | 9/2015 | ............... F16F 9/53 |
| CN | 204755714 | 11/2015 | ............... F16F 9/53 |
| CN | 105751847 | 7/2016 | ......... B60G 17/0195 |
| JP | H10184755 | 7/1998 | ............. F16F 15/03 |

* cited by examiner

DAMPER OF SEMI-ACTIVE ENERGY REGENERATIVE SUSPENSION BASED ON HYBRID EXCITATION AND ITS SIZE DETERMINATION METHOD

TECHNICAL FIELD

The present invention belongs to the field of automotive suspension, and, in particular, relates to a damper for a semi-active energy regenerative suspension based on hybrid excitation and a method for determining the sizes thereof.

BACKGROUND ART

At present, most of the vehicle suspensions still use the traditional double-tube dampers, the damping coefficients of which cannot be changed under the different driving cycle. As a result, such dampers can only achieve good damping performances in the specific conditions while not be adaptive to different roads, and thus the damping performances thereof are limited. In addition, for most traditional dampers, once the damper is failed, the vehicle will completely lose the capacity of isolating vibration, which has a great influence on the riding comfort and control stability of the automotive.

On the other hand, environmental and energy problems are becoming increasingly serious all over the world. In the case of conventional internal combustion engines, only 16% of the energy is used to drive vehicles, and the remaining energy is consumed by energy-consuming components in the form of heat. Recovery and reuse of energy recovery is an effective way to save energy in the automotive. Some studies have shown the followings: a regenerative braking can increase fuel efficiency by up to 30%; the waste heat recovery can increase fuel efficiency by 10% to 30%; and an energy-regenerative suspension can increase fuel efficiency by 10%.

A linear motor has a simple and compact structure, and provides high efficiency and good anti-electromagnetic performance, wherein there is no radial force present between an armature and a stator. Bose Corporation developed an active energy-regenerative suspension based on linear motor, which can recycle a part of the automotive vibration energy and improves the dynamic performance of the automotive at the same time. However, the linear motor cannot recover the vibration energy and keeps a high level of energy consumption when it outputs an active force. In addition, the Chinese patent application CN201310105535.0 discloses a semi-active energy-regenerative suspension of hybrid electric vehicles, wherein a cylindrical and linear generator is integrated with a traditional passive damper, and wherein a throttle is opened on the piston rod so that the damping force is adjustable. However, the ways to adjust the damping force are complex and unstable. Additionally, the linear motor, which is only used to recover energy, is not adequately used. Therefore, it is urgent to propose a new structure, which is able to recover energy while outputting an adjustable damping force.

Hybrid excitation, a new way of excitation, combines the electric excitation and excitation by a permanent magnet. Compared with a permanent magnet motor, the hybrid excitation motor has the ability to regulate the magnetic field within an air-gap. Meanwhile, compared with the synchronous motor, the hybrid excitation motor has a smaller reactance of armature reaction. Therefore, the present invention proposes the concept to integrate a linear motor based on hybrid excitation with a traditional damper.

BRIEF SUMMARY OF THE INVENTION

In view of the shortcomings of the prior art technology, the present invention proposes a damper for a semi-active energy regenerative suspension based on hybrid excitation and a method for determining the sizes thereof. Particularly, a cylindrical and linear motor based on hybrid excitation is integrated with a conventional hydraulic shock absorber. When the automotive is running, the riding comfort and control stability could be improved by altering the current magnitude and direction of the DC excitation winding, so that the damping force of the suspension is adjustable in real time according to the riding working conditions. Meanwhile, the vibration energy is recovered via the relative motion between the sprung weight and the un-sprung weight, which improves the fuel economy and reduces the energy consumption. In addition, the damper of the present invention provides a fail-safe function. Therefore, the suspension operates normally when the linear motor based on hybrid excitation partly fails, as the hydraulic shock absorber can still provide a damping force.

The above objects of the present invention are achieved by the following technical solutions.

In one aspect, the present invention provides a method for determining the sizes of a damper for a semi-active energy regenerative suspension based on hybrid excitation, comprising the steps of:

Step 1), deducing the analytical expression of the electromagnetic damping force and the analytical expression of the induced electromotive force of the damper for a semi-active energy regenerative suspension;

Step 2), determining the rated data of the damper for a semi-active energy regenerative suspension according to the particular working conditions and technical requirements of the damper for a semi-active energy regenerative suspension, determining the adjustable range of hybrid damping force and the type of the hydraulic shock absorber (10);

Step 3), determining the size of a permanent magnet (203) according to the analytical expression of the electromagnetic damping force of the damper for a semi-active energy regenerative suspension, wherein the excitation current in a DC excitation winding (205) is assumed as zero; and determining the number of windings and the wire diameter of the DC excitation winding (205) according to the input range of DC excitation current in the DC excitation winding (205);

Step 4), optimizing the overall dimensions of a motor by particle swarm optimization (PSO) algorithm, wherein the electromagnetic damping force provided by unit excitation current is taken as the objective function, and wherein the constraint conditions are as follows: the magnetic density of each part of the motor does not exceed the maximum value of the magnetic; the boundary dimensions of the motor meet requirements; the excitation current is no more than 3 A; and the electromagnetic damping power is greater than the minimum value; substituting the above constraint conditions into the objective function with a penalty function, wherein the parameters set in the particle swarm optimization algorithm include a population size of the particle swarm, learning factors, inertia weights, an independent variable and the number of iterations;

Step 5), substituting the overall dimensions of the motor obtained as described above into the analytical expression of the electromagnetic damping force and the analytical expression of the induced electromotive force so as to obtain the analytic value of the electromagnetic damping force and the analytic value of the energy recovered in the damper for a semi-active energy regenerative suspension:

Step 6), comparing the rated data of step 2) and the analytic values calculated in step 5), and moving to the next step if the design requirements are met, or otherwise if the design requirements are not met, returning to step 3);

Step 7), establishing a motor model according to the initial sizes of each part of the motor as determined in step 3) and step 4) in the simulation software, Ansoft; simulating the hybrid excited linear motor, and performing the finite element analysis; and optimizing the dimensions of hybrid excitation mechanism (20) via comparing the finite element value with the analytic value calculated in step 4), wherein the parameters to be optimized include the width of the permanent magnet (203), the length of DC excitation winding (205) and the length of the air-gap between a stator and a mover in the motor;

Step 8), obtaining the optimized sizes of the hybrid excitation mechanism (20) after being optimized; and comparing the performances of the damper for a semi-active energy regenerative suspension before and after optimization, wherein, if there is no significant improvement after optimization in term of the performances of the damper, return to step 6); and Step 9), determining the final sizes of the damper for a semi-active energy regenerative suspension.

Preferably, the analytical expression of the electromagnetic damping force deduced in the step 1) is $$F_E = \frac{k_f k_v (\dot{z}_2 - \dot{z}_1)}{R_m + R_l},$$

wherein $F_E$ is the electromagnetic damping force of the damper for a semi-active energy regenerative suspension; $k_f$ is the electromagnetic damping force coefficient; $k_v$ is the voltage coefficient of winding; $(\dot{z}_2 - \dot{z}_1)$ is the relative velocity between the mover and the stator; $R_m$ is the motor internal resistance; and $R_l$ is the resistance of a loaded circuit.

Preferably, the analytical expression of the induced electromotive force deduced in the step 1) is $$V_{emf} = -m 2\pi r \frac{A_m B_m}{A_{coil}} \frac{dx}{dt} = -k_v (\dot{z}_2 - \dot{z}_1),$$

wherein $V_{emf}$ is the induced electromotive force of the damper for a semi-active energy regenerative suspension; m is the number of windings of the three-phase windings (202); r is the wire diameter of the three-phase windings (202); $A_m$ is the radial section area of the permanent magnet (203); $A_{coil}$ is the radial section area of the three-phase windings (202); $B_m$ is the magnetic induction intensity of the permanent magnet (203); $k_v$ is the voltage coefficient of the winding; and $(\dot{z}_2 - \dot{z}_1)$ is relative velocity between the mover and the stator.

Preferably, the final sizes of the damper for a semi-active energy regenerative suspension determined by step 9) are as follows: the thickness of an iron core, $\tau_i$, equals to 5.7 mm; the thickness of the permanent magnet, $\tau_m$, equals to 10.5 mm; the width of the three-phase windings, $\tau_c$, equals to 8.4 mm; the yoke radius of the stator, $r_s$, equals to 33.55 mm; the outer diameter of the three-phase windings, $r_c$, equals to 32.2 mm; the internal diameter of the three-phase windings, $r_a$, equals to 29.2 mm; the outer diameter of the permanent magnet, $r_m$, equals to 28.2 mm; the internal diameter of the permanent magnet, $r_w$, equals to 22.2 mm; the outer diameter of the direct current excitation, $r_i$, equals to 19.2 mm; the internal diameter of the direct current excitation, $r_p$, equals to 4.2 mm.

Preferably, the parameters set in the particle swarm optimization algorithm in step 4) are as follows: the population size of the particle swarm is 40; the learning factors are all of 2; the inertia weights are all of 0.9; the independent variable is 4; and the number of iterations is 500. In a second aspect, the present invention provides a damper for a semi-active energy regenerative suspension determined by a method for determining the sizes of a damper for a semi-active energy regenerative suspension based on hybrid excitation, comprising an upper lifting lug, a lower lifting lug and a hydraulic shock absorber main body disposed between the upper lifting lug and the lower lifting lug, characterized in that further comprising a hybrid excitation mechanism, and a dustcover wrapping the periphery of the hydraulic shock absorber main body; wherein the hybrid excitation mechanism includes a stator and a mover; and, wherein the stator includes a conductor tube and a three-phase winding, and the mover includes a permanent magnet, an iron core and a DC excitation winding;

wherein the upper lifting lug is welded to the dustcover at both sides of the lower end of the upper lifting lug, and the dustcover is welded to the conductor tube at both sides of the lower end of the dustcover; wherein a three-phase winding is arranged in the interior of the conductor tube; wherein the mover with permanent magnet attached thereto is welded to the outer wall of the oil storage cylinder barrel, and has an open rectangular groove with a DC excitation winding wound therein; and wherein the iron core is in contact with the permanent magnet; and wherein there is an air-gap of fixed dimension between the stator and the mover, and the excitation magnetic field in the air-gap is produced by the permanent magnet in combination with the DC excitation winding; and wherein the permanent magnet provides a main excitation field during the running of the motor while the DC excitation winding provides an auxiliary excitation magnetic field during the running of the motor.

Preferably, the hydraulic shock absorber main body includes a piston rod, an skeleton oil seal, a guide holder, a working cylinder barrel, a piston, a flow valve, a rebound valve, an oil storage cylinder barrel, a compression valve and a recuperation valve;

wherein the upper end of the piston rod is welded within the interior of dustcover, and the lower end of the piston rod, which extends into the working cylinder barrel, is connected to the piston; the rebound valve is disposed on the upper surface of the piston, and the flow valve is disposed on the lower surface of the piston; the working cylinder barrel is compressed by the guide holder at the top of the working cylinder barrel; the compression valve and the recuperation valve are disposed at the lower end of the working cylinder barrel; wherein the piston rod and the skeleton oil seal are fitted with each other and disposed at the top of the oil storage cylinder barrel; and wherein the oil storage cylinder barrel, equipped with the working cylinder barrel therein, is welded to the lower lifting lug at the lower end of the oil storage cylinder barrel.

Preferably, both of the dustcover and oil storage cylinder barrel are made of non-magnetic materials.

Preferably, the hybrid excitation mechanism is a cylindrical and linear motor which integrates the electrical excitation and the permanent magnet excitation.

Preferably, the determined final sizes of the damper for a semi-active energy regenerative suspension are as follows: the thickness of an iron core, $\tau_i$, equals to 5.7 mm; the thickness of the permanent magnet, $\tau_m$, equals to 10.5 mm; the width of the three-phase windings, $\tau_c$, equals to 8.4 mm; the yoke radius of the stator, $r_s$, equals to 33.55 mm; the outer diameter of the three-phase windings, $r_c$, equals to 32.2 mm; the internal diameter of the three-phase windings, $r_a$, equals to 29.2 mm; the outer diameter of the permanent magnet, $r_m$, equals to 28.2 mm; the internal diameter of the permanent magnet, $r_w$, equals to 22.2 mm; the outer diameter of the direct current excitation, $r_i$, equals to 19.2 mm; the internal diameter of the direct current excitation, $r_p$, equals to 4.2 mm.

The advantageous effects of the present invention comprise the followings:

1, The hybrid excitation linear motor and the hydraulic shock absorber are integrated, and thus the damping force could be adjusted by changing the magnitude of excitation current generated by the DC-excitation winding, which improves the vibration isolating performance of the damper. At the same time, an induced current is produced in the three-phase winding due to the relative motion between the stator and the mover of the hybrid excitation mechanism. Therefore, the energy of vibration can be converted into electrical energy and stored, which achieves that the energy is recovered while providing adjustable damping force. In addition, the damper of the present invention provides a fail-safe function, as the hybrid excitation mechanism and the hydraulic shock absorber worked independently. Therefore, the suspension operates normally when the hybrid excitation mechanism fails, as the hydraulic shock absorber can still provide a damping force.

2. Based on the deduced analytic expression of the electromagnetic damping force, a simple method for determining the sizes of a damper is proposed. The algorithm of particle swarm optimization based on the penalty function is used to obtain the optimal size so that the damping force is the largest. In addition, the width of the permanent magnet, the length of the DC-excitation winding and the length of the air-gap between the stator and the mover are optimized via performing the finite element analysis, which increases the magnitude of the damping force of the damper and that of the energy recovered. Such method has practical utility.

In the above drawings, the references are as follows: 1—upper lifting lug, 2—dustcover, 3—lower lifting lug, 10—hydraulic shock absorber main body, 101—piston rod, 102—skeleton oil seal, 103—guide holder, 104—working cylinder, 105—piston, 106—flow valve, 107—rebound valve, 108—oil storage cylinder, 109—compressive valve, 110—recuperation valve, 20—hybrid excitation mechanism, 201—conductor tube, 202—three-phase winding, 203—permanent magnet, 204—iron core, 205—DC excitation winding.

DETAILED DESCRIPTION OF THE PREFERRED EMBODIMENTS

Further explanation of the proposed invention will be presented with reference to the drawings and embodiments. It is to be understood, however, that the invention is not limited to the following embodiments.

Figure 1:
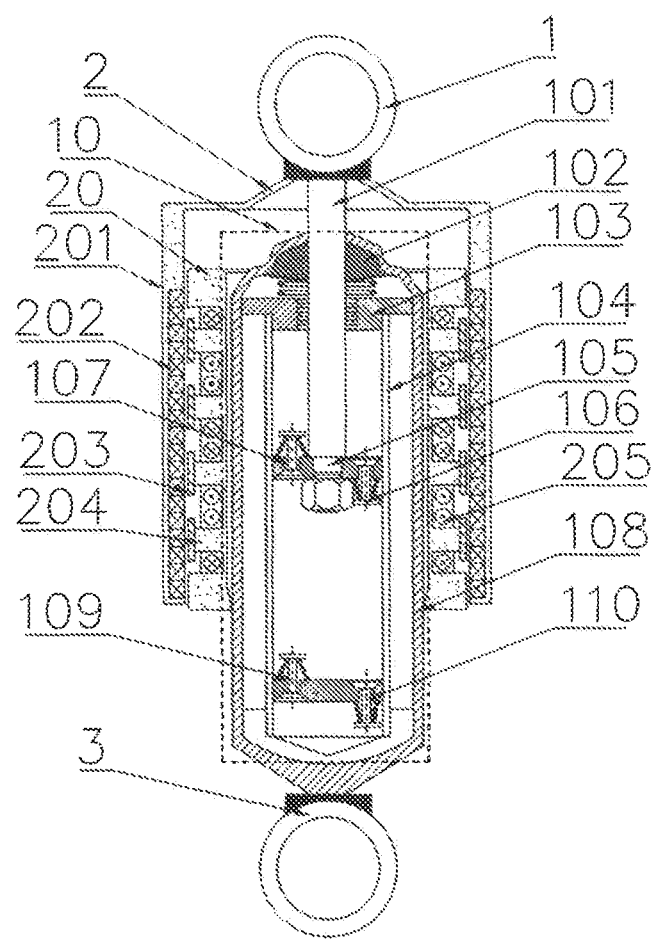
FIG. 1 is a structure diagram of a damper for a semi-active energy regenerative suspension determined by a method for determining the sizes of a damper for a semi-active energy regenerative suspension based on hybrid excitation according to the present invention.

As shown in the FIG. 1, a damper for a semi-active energy regenerative suspension determined by a method for determining the sizes of a damper for a semi-active energy regenerative suspension based on hybrid excitation comprises an upper lifting lug 1, a lower lifting lug 3, and a hydraulic shock absorber main body 10 disposed between the upper lifting lug 1 and the lower lifting lug 3.

The hydraulic shock absorber main body 10 includes a piston rod 101, a skeleton oil seal 102, a guide holder 103, a working cylinder barrel 104, a piston 105, a flow valve 106, a rebound valve 107, an oil storage cylinder barrel 108, a compression valve 109 and a recuperation valve 110.

The upper end of the piston rod 101 is welded within the interior of the dustcover 2, and the lower end of the piston rod 101, which extends into the working cylinder barrel 104, is connected to the piston 105. The rebound valve 107 is disposed on the upper surface of the piston 105, and the flow valve 106 is disposed on the lower surface of the piston 105. The working cylinder barrel 104 is compressed by the guide holder 103 at the top of the working cylinder barrel 104. The compression valve 109 and the recuperation valve 110 are disposed at the lower end of the working cylinder barrel 104. The piston rod 101 and the skeleton oil seal 102 are fitted with each other and disposed at the top of the oil storage cylinder barrel 108. The oil storage cylinder barrel 108, equipped with the working cylinder barrel 104 therein, is welded to the lower lifting lug 3 at the lower end of the oil storage cylinder barrel 108.

A damper for a semi-active energy regenerative suspension determined by a method for determining the sizes of a damper for a semi-active energy regenerative suspension based on hybrid excitation further comprises a hybrid excitation mechanism 20, and a dustcover 2 wrapping the periphery of the hydraulic shock absorber main body 10. The hybrid excitation mechanism 20 is a cylindrical and linear motor which integrates the electrical excitation and the permanent magnet excitation.

The hybrid excitation mechanism 20 includes a stator and a mover, wherein the stator includes a conductor tube 201 and a three-phase winding 202, and the mover includes a permanent magnet 203, an iron core 204 and a DC excitation winding 205.

The upper lifting lug 1 is welded to the dustcover 2 at both sides of the lower end of the upper lifting lug 1, and the dustcover 2 is welded to the conductor tube 201 at both sides of the lower end of the dustcover 2. A three-phase winding 202 is arranged in the interior of the conductor tube 201. The mover with permanent magnet 203 attached thereto is welded to the outer wall of the oil storage cylinder barrel 108, and has an open rectangular groove with a DC excitation winding 205 wound therein. The iron core 204 is in contact with the permanent magnet 203.

Figure 2:
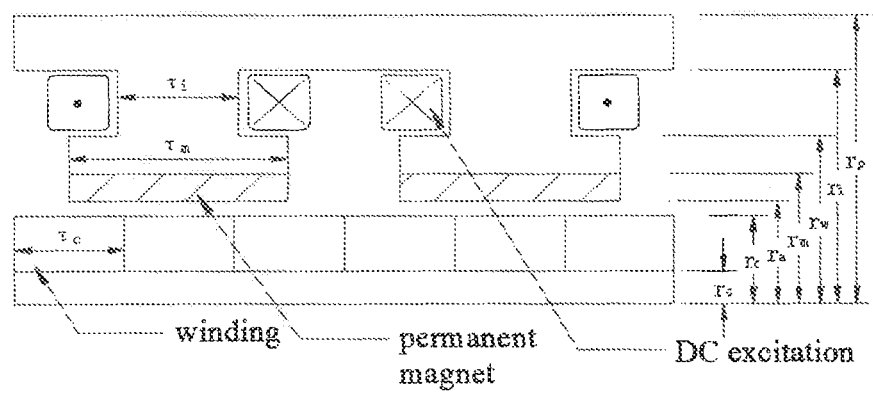
FIG. 2 is a structure diagram for a pair of magnetic poles in the hybrid excitation mechanism according to the present invention.

There is an air-gap of fixed dimension between the stator and the mover, and the excitation magnetic field in the air-gap is produced by the permanent magnet 203 in combination with the DC excitation winding 205. The permanent magnet 203 provides a main excitation field during the running of the motor while the DC excitation winding 205 provides an auxiliary excitation magnetic field during the running of the motor. The hybrid excitation mechanism 20 is composed of several pairs of magnetic poles having the same structures, wherein FIG. 2 illustrates a pair of such magnetic poles.

Both of the dustcover 2 and oil storage cylinder barrel 108 are made of non-magnetic materials.

The particular working processes of the damper for a semi-active energy regenerative suspension based on hybrid excitation are as follows:

When an automobile is running, there is relative movement between the car body and the wheels due to the unevenness of a road, which activates a damper for a suspension to work. When the damper is compressed or stretched, the oil fluid in the hydraulic shock absorber 10 flows between the upper chamber and lower chamber of the piston 105, wherein the throttling actions of the flow valve 106, the rebound valve 107, the compression valve 109 and the recuperation valve 110 to the oil fluid forms a viscous damping force. At this time, since the stator of the hybrid excitation mechanism 20 is connected to the upper lifting lug 1 and the dustcover 2, and the stator and the mover of the hybrid excitation mechanism 20 are connected to the oil storage cylinder barrel 108, there is a relative movement between the stator and the mover of the hybrid excitation mechanism 20. According to the Faraday's law of electromagnetic induction, there is an induced current in the three-phase winding 202, which converts the vibration energy into the electric energy for storing, and achieves the energy regeneration of the damper. Meanwhile, according to Lenz's law, an electromagnetic damping force is produced accompanied by the generation of the induced current. When the DC excitation winding 205 is not powered, the magnetic field in the air-gap is produced solely by the permanent magnet 203, and thus the electromagnetic damping coefficient is constant. When the induced current is generated in the three-phase winding 202, the vibration energy is converted into the electric energy. If the magnitude of the excitation current in the DC excitation winding 205 is changed according to different working conditions, and thus the magnetic induction intensity in the air-gap changes dependent on the excitation current, the electromagnetic damping coefficient can be changed in order to achieve an adjustable damping value of the damper.

Figure 3:
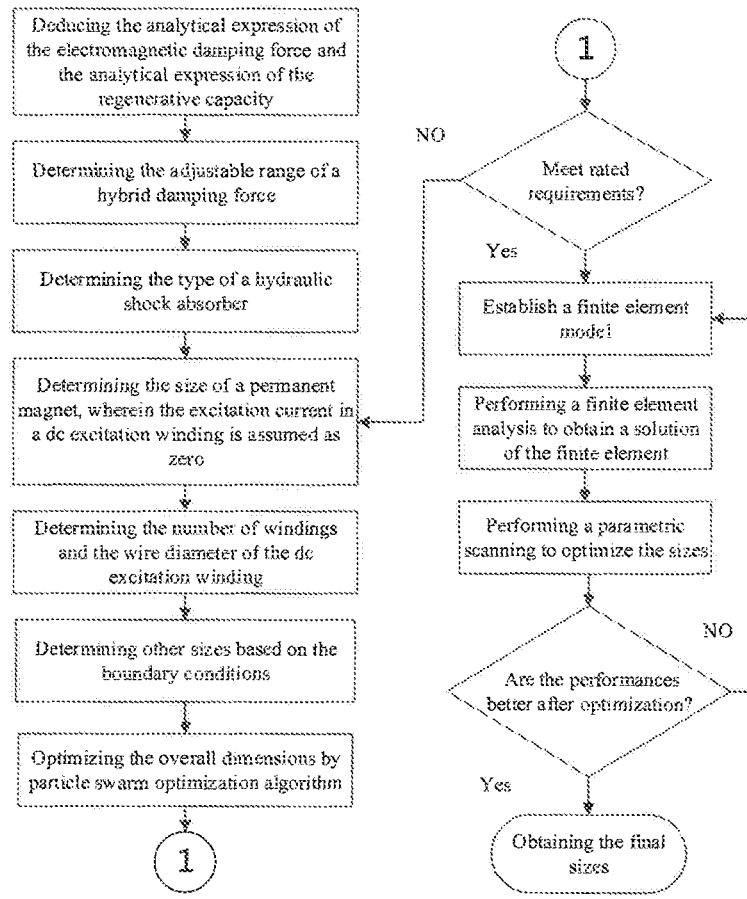
FIG. 3 is a flow chart of the method for determining the sizes of a damper according to the present invention.

FIG. 3 illustrates the flow chart of a method for determining the sizes of a damper for a semi-active energy regenerative suspension based on hybrid excitation, wherein the method comprises the steps of:

Step 1): deducing the analytical expression of the electromagnetic damping force and the analytical expression of the induced electromotive force of the damper for a semi-active energy regenerative suspension;

Deducing the Analytical Expressions:

① Deducing the Magnetic Field Strength of Each Part of the Hybrid Excitation Mechanism:

According to Ampere circuital theorem, it can be known that:

$$\oint H \cdot dl = \int_{magnet} H \cdot dl + \int_{iron} H \cdot dl + \int_{electro-magnetic} H \cdot dl + \int_{coil} H \cdot dl + \int_{air} + H \cdot dl = 0 \quad (1)$$

wherein H refers to magnetic field strength. The equation (1) is obtained based on the following assumptions: the permanent magnet is radial magnetized; the magnetic field inside the air-gap is totally radial, and the magnetic induction lines in each part of the magnetic pole are parallel to the loop C; the magnetic leakage in the structure is neglected; there is no magnetic saturation in the material; and, the connecting part of the hydraulic shock absorber and the hybrid excitation motor is made of the non-magnetic material.

Equation (1) can be written as:

$$\oint H \cdot dl = 2H_m(r_w - r_m) + 2\int_{r_i}^{r_w} \frac{B_{pole}}{\mu_0 \mu_{Fe}} dr - 2\int_{r_p}^{r_i} N \cdot I dr + 2\int \frac{B_{tube} \cdot 4\tau_c}{\mu_0 \mu_{Fe}} + 2\int_{r_m}^{r_a} \frac{B_{air}}{\mu_0} dr + 2\int_{r_a}^{r_c} \frac{B_{coil}}{\mu_0 \mu_{cu}} dr = 0 \quad (2)$$

wherein c refers to the equivalent magnetic circuit; $H_m$ refers to the magnetic field strength of the permanent magnet 203; $r_w$ is the inner diameter of the permanent magnet 203; $r_m$ is the outer diameter of the permanent magnet 203; $r_i$ is the outer diameter of the DC excitation winding 205; $B_{pole}$ is the magnetic induction intensity of the iron core 204; $\mu_0$ is the permeability of vacuum; $\mu_{Fe}$ is the relative permeability of iron; $r_p$ is the inner radius of the DC excitation winding 205; N refers to the number of windings of the DC excitation winding 205; I is the excitation current; $B_{tube}$ is the axial magnetic induction intensity of the three-phase winding 202; $\tau_c$ is the width of the three-phase winding 202; $r_a$ is the inner diameter of the three-phase winding 202; $B_{air}$ is the magnetic induction intensity in the air-gap; $r_c$ is the outer diameter of the three-phase winding 202; $B_{coil}$ is the radial magnetic induction intensity of the three-phase winding 202; and $\mu_{Cu}$ is the relative permeability of copper.

For the permanent magnet 203, the magnetic induction intensity thereof, $B_m$, could be expressed as follows:

$$B_m = B_r + \mu_0 \mu_r H_m \quad (3)$$

wherein $B_r$ refers to the residual magnetic induction intensity, and $\mu_r$ refers to the reversible permeability.

In view of Equation 3, Equation 4 can be written as follows:

$$H_m = \frac{B_m - B_r}{\mu_0 \mu_r} \quad (4)$$

Since the magnetic leakage is neglected, the following Equation 5 may be obtained:

$$A_m B_m = A_{pole} B_{pole} = A_{tube} B_{tube} = A_{air} B_{air} = A_{coil} B_{coil} \quad (5)$$

wherein $A_m$ is the radial sectional area of the permanent magnet 203; $A_{pole}$ is the sectional area of the iron core 204; $A_{tube}$ is the axial sectional area of the three-phase winding; $A_{coil}$ is the radial sectional area of the three-phase winding 202; and $A_{air}$ is the sectional area of the air-gap. In view of Equation (5), the magnetic intensities in each part of the hybrid excitation mechanism could be expressed in term of the magnetic induction intensity of the permanent magnet 203, $B_m$:

$$\int_{r_i}^{r_w} \frac{B_{pole}}{\mu_0 \mu_{Fe}} dr = \int_{r_i}^{r_w} \frac{A_m B_m}{\mu_0 \mu_{Fe} A_{pole}} dr = k_{pole} B_m \quad (6)$$

$$\frac{B_{tube} \cdot 4\tau_c}{\mu_0 \mu_{Fe}} = \frac{A_m B_m \cdot 4\tau_c}{\mu_0 \mu_{Fe} A_{tube}} = k_{tube} B_m \quad (7)$$

$$\int_{r_m}^{r_a} \frac{B_{air}}{\mu_0} dr = \int_{r_m}^{r_a} \frac{A_m B_m}{\mu_0 A_{air}} dr = k_{air} B_m \quad (8)$$

$$\int_{r_a}^{r_c} \frac{B_{coil}}{\mu_0 \mu_{cu}} dr = \int_{r_a}^{r_c} \frac{A_m B_m}{\mu_0 \mu_{cu} A_{coil}} dr = k_{coil} B_m \quad (9)$$

wherein $k_{pole}$ is the coefficient of the magnetic induction intensity of the iron core 204; $k_{air}$ is the coefficient of the magnetic induction intensity of the air-gap; $k_{coil}$ is the coefficient of the radial magnetic induction intensity of the three-phase winding 202; and, $k_{tube}$ is the coefficient of the axial magnetic induction intensity of the three-phase winding 202.

By Substituting Equations 6-9 and Equation 4 into Equation 2, the magnetic induction intensity of the permanent magnet 203, $B_m$, is obtained as follows:

$$B_m = \frac{(r_w - r_m)B_r + (r_i - r_p)\mu_0 \mu_r NI}{[r_w - r_m + \mu_0 \mu_r (k_{coil} + k_{air} + k_{tube} + k_{pole})]} \quad (10)$$

Therefore, the magnetic induction intensity at each part of magnetic path could be expressed by Equations (6)-(9) using $B_m$.

② Deducing the Analytical Expression of the Induction Electromotive Force

According to the law of electromagnetic induction, for a coil of single winding, the induction voltage is expressed as follows:

$$V_{emf\ single} = -2\pi r B_{coil}(\dot{z}_2 - \dot{z}_1) \quad (11)$$

Wherein $(\dot{z}_2 - \dot{z}_1)$ refers to the relative velocity between the stator and the mover.

According to the above deducing process, $B_{coil}$ can be expressed by $B_m$. Therefore, the induction voltage of the winding could be written as:

$$B_{coil} = \frac{A_m B_m}{A_{coil}} \quad (12)$$

$$V_{emf\ single} = -2\pi r \frac{A_m B_m}{A_{coil}}(\dot{z}_2 - \dot{z}_1) \quad (13)$$

$$V_{emf} = -m 2\pi r \frac{A_m B_m}{A_{coil}} \frac{dx}{dt} = -k_v(\dot{z}_2 - \dot{z}_1) \quad (14)$$

wherein m is the number of windings in the three-phase winding 202; r is the wire diameter of the three-phase winding 202; and, $k_v$ refers to the voltage constant of the winding, $$k_v = N 2\pi r \frac{A_m B_m}{A_{coil}}.$$

It can be seen from the expression of $B_m$ in Equation 10 that both of $B_m$ and $k_v$ vary with the excitation current.

③ Deducing the Analytical Expressions of the Electromagnetic Damping Force

According to Lorentz's law, for a coil of single winding, the electromagnetic force which is experienced by such coil in a magnetic field is as follows:

$$F_{E\ single} = 2\pi r B_{coil} i \quad (15)$$

By substituting $B_m$ deduced in Equation 10 into $B_{coil}$, the electromagnetic damping force generated by a single pair of magnetic pole is as follows:

$$F_E = m 2\pi r \frac{A_m B_m}{A_{coil}} i = k_f i \quad (16)$$

wherein $$k_f = m 2\pi r \frac{A_m B_m}{A_{coil}}$$

refers to the coefficient of the electromagnetic damping force, which also varies with the excitation current.

In addition, $$i = \frac{V_{emf}}{R_m + R_l} = \frac{k_v(\dot{z}_2 - \dot{z}_1)}{R_m + R_l} \quad (17)$$

wherein $R_m$ is the motor resistance, and $R_L$ is the resistance of a loaded circuit. As a result, Eq. 16 can be written as:

$$F_E = \frac{k_f k_v(\dot{z}_2 - \dot{z}_1)}{R_m + R_l} \quad (18)$$

Step 2): determining the rated data of the damper for a semi-active energy regenerative suspension according to the particular working conditions and technical requirements of the damper for a semi-active energy regenerative suspension, and determining the adjustable range of hybrid damping force and the type of the hydraulic shock absorber 10;

Step 3): determining the size of a permanent magnet 203 according to the analytical expression of the electromagnetic damping force of the damper for a semi-active energy regenerative suspension, wherein the excitation current in a DC excitation winding 205 is assumed as zero; and determining the number of windings and the wire diameter of the DC excitation winding 205 according to the input range of DC excitation current in the DC excitation winding 205;

Step 4): optimizing the overall dimensions of a motor by particle swarm optimization (PSO) algorithm with a penalty function;

The target for optimization is to improve the electromagnetic damping force provided by the unit excitation current. Therefore, the objective function is defined as $$f(X) = \frac{F_E - F_0}{I_i}$$

where $F_E$ refers to the electromagnetic damping force provided by hybrid excitation mechanism; $F_0$ is the electromagnetic damping force when excitation current is zero; and $I_i$ is the value of the excitation current.

The mainly involved variables comprise the width of the conductor tube 201, $r_p$, the length of the iron core 204, $r_i$, and, the width of the iron core 204, $\tau_i$.

The constraint conditions of the particle swarm optimization algorithm are set as follows: the magnetic density of each part of the motor does not exceed the maximum value of the magnetic, $B_{max}$; the boundary dimensions are limited; the excitation current is no more than 3 A; and $F_0 \leqslant F_E$.

In general, the particle swarm algorithm is applied to unconstrained optimization problems. Herein, since a lot of constraint conditions are introduced, the penalty function F(X) is introduced to transform a constrained programming problem into an unconstrained problem. Because the constraints in the dimension optimization of the proposed structure are all inequality constraints, the penalty function is defined as:

$$F(X) = f(X) + \mu \sum_{i=1}^{m} (\max\{0, -g_i(x)\})^2$$

wherein μ is a constant with great value; $g_i(x)$ is the constraint condition. The parameters set in the particle swarm optimization algorithm are as follows: the population size of the particle swarm is 40; the learning factors are all of 2; the inertia weights are all of 0.9; the independent variable is 3; and the number of iterations is 500.

Assuming that the width of the conductor tube 201, $r_p$, the length of the iron core 204, $r_i$, and the width of the iron core 204, $\tau_i$, are 6 mm, 15 mm, 4.5 mm, respectively, the optimization results are shown in the Table. 1.

TABLE 1

Comparison between the initial data and the data optimized with the particle swarm optimization algorithm

| Optimization variable | conductor tube width, $r_p$ | iron core length, $r_i$ | iron core width, $\tau_i$ | f(X) |
|---|---|---|---|---|
| Initial scheme | 6 mm | 15 mm | 4.5 mm | 14.5 |
| Improved scheme | 4.2 mm | 15 mm | 5.7 mm | 15.6 |

The matlab codes employed for the particle swarm optimization algorithm are as follows:

```
function [xm,fv]=PSO(fitness,N,c1,c2,w,M,D)
% the objective function to be optimized:  fitness
% the number of the particles:  N
% learning factors:  c1, c2
% the inertia weight:  w
% the maximum number of iteration:  M
% the number of the independent variables:  D
% the independent variable with which the objective function shows
the minimum value:  xm
% the minimum value of the objective function:  fv
format long;
for i=1:N
    for j=1:D
        x(i,j)=randn;
        v(i,j)=randn;
    end
end
for i=1:N
    p(i)=fitness(x(i,:));
    y(i,:)=x(i,:);
end
pg=x(N,:);
for i=1:(N-1)
    if fitness(x(i,:))<fitness(pg)
        pg=x(i,:);
    end
end
for t=1:M
    for i=1:N
        v(i,:)=w*v(i,:)+c1*rand*(y(i,:)-x(i,:))+c2*rand*(pg-x(i,:));
        x(i,:)=x(i,:)+v(i,:);
        if fitness(x(i,:))<p(i)
            p(i)=fitness(x(i,:));
            y(i,:)=x(i,:);
        end
        if p(i)<fitness(pg)
            pg=y(i,:);
        end
    end
    pbest(t)=fitness(pg);
end
xm=pg';
fv=fitness(pg);
```

Step 5): substituting the overall dimensions of the motor obtained as described above into the analytical expression of the electromagnetic damping force and the analytical expression of the induced electromotive force so as to obtain the analytic value of the electromagnetic damping force and the analytic value of the energy recovered in the damper for a semi-active energy regenerative suspension;

Step 6): comparing the rated data of step 2) and the analytic values calculated in step 5); and moving to the next step if the design requirements are met, or otherwise if the design requirements are not met, returning to step 3);

Step 7): establishing a motor model according to the initial sizes of each part of the motor as determined in step 3) and step 4) in the simulation software, Ansoft; simulating the hybrid excited linear motor, and performing the finite element analysis; and optimizing the dimensions of hybrid excitation mechanism 20 via comparing the finite element value with the analytic value calculated in step 4), wherein the parameters to be optimized include the width of the permanent magnet 203, the length of DC excitation winding 205 and the length of the air-gap between a stator and a mover in the motor;

Step 8): obtaining the optimized sizes of the hybrid excitation mechanism 20 after being optimized; and comparing the performances of the damper for a semi-active energy regenerative suspension before and after optimization, wherein, if there is no significant improvement after optimization in term of the performances of the damper, return to step 6); and Step 9): determining the final sizes of the damper for a semi-active energy regenerative suspension.

A single pair of magnetic poles in the hybrid excitation mechanism 20 is shown in FIG. 2. According to the suspension working conditions and technical requirements of small-scale vehicles, the particular sizes of the hybrid excitation mechanism 20 before optimization are determined as follows: the thickness of an iron core 204, $\tau_i$, equals to 4.5 mm; the thickness of the permanent magnet 203, $\tau_m$, equals to 10.5 mm; the width of the three-phase windings 202, $\tau_c$, equals to 8.4 mm; the yoke radius of the stator, $r_s$, equals to 35.8 mm; the outer diameter of the three-phase windings 202, $r_c$, equals to 34.45 mm; the internal diameter of the three-phase windings 202, $r_a$, equals to 31.45 mm; the outer diameter of the permanent magnet 203, $r_m$, equals to 30 mm; the internal diameter of the permanent magnet 203, $r_w$, equals to 24 mm; the outer diameter of the direct current excitation winding 205, $r_i$, equals to 21 mm; and the internal diameter of the direct current excitation winding 205, $r_p$, equals to 6 mm.

Figure 4:
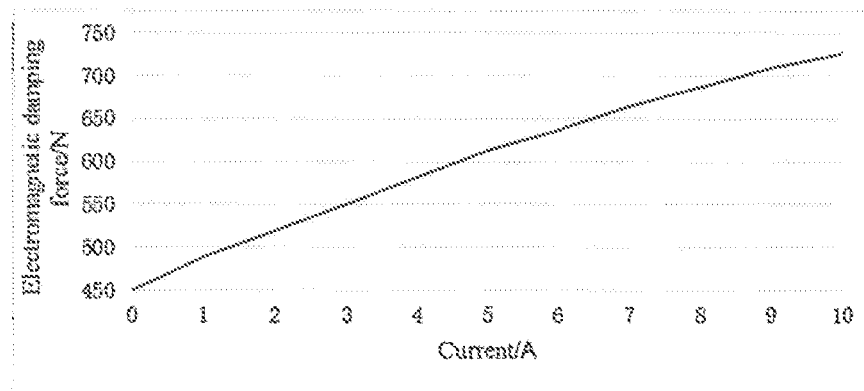
FIG. 4 is a graph showing the change of the electromagnetic damping force with the excitation current according to the present invention.

Finite element analysis software Ansoft is used to create a model, define materials, apply excitation, split the model, define motions, and perform simulation. FIG. 4 shows the trend that the electromagnetic damping force of the hybrid excitation mechanism 20 varies with the excitation current.

Parametric scanning method is used to optimize the length of the air-gap, the length of the DC excitation winding, and the width of the permanent magnet. The purpose of such optimization is to balance the direct-current excitation magnetic field and the permanent magnet field so as to prevent magnetic saturation which affects the adjustable range of the magnetic field.

The optimized sizes are as follows: the thickness of the iron core 204, $\tau_i$, equals to 5.7 mm; the thickness of the permanent magnet 203, $\tau_m$, equals to 10.5 mm; the width of the three-phase windings 202, $\tau_c$, equals to 8.4 mm; the yoke radius of the stator, $r_s$, equals to 33.55 mm; the outer diameter of the three-phase windings 202, $r_c$, equals to 32.2 mm; the internal diameter of the three-phase windings 202, $r_a$, equals to 29.2 mm; the outer diameter of the permanent magnet 203, $r_m$, equals to 28.2 mm; the internal diameter of the permanent magnet 203, $r_w$, equals to 22.2 mm; the outer diameter of the direct current excitation winding 205, $r_i$, equals to 19.2 mm; and the internal diameter of the direct current excitation winding 205, $r_p$, equals to 4.2 mm.

Figure 5:
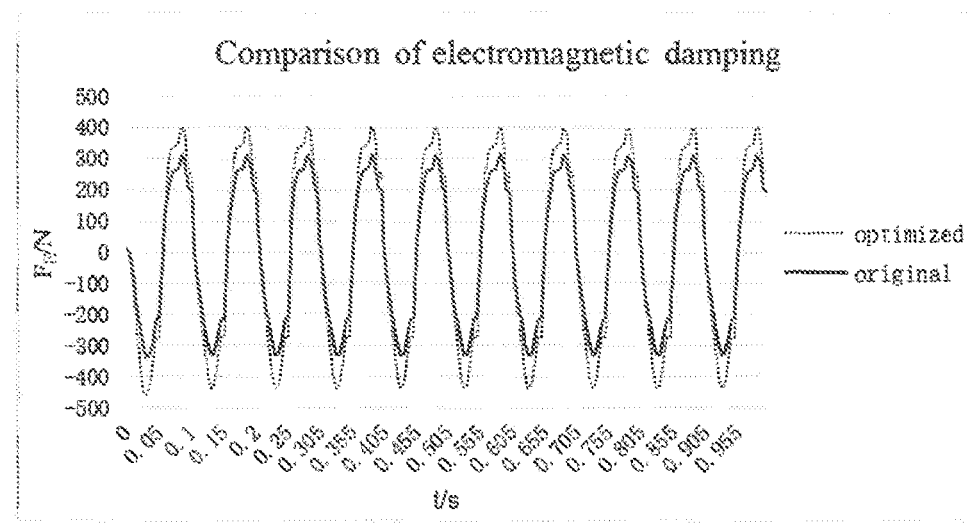
FIG. 5 compares the vibration isolation properties of the hybrid excitation mechanism before and after the sizes of the hybrid excitation mechanism are optimized according to the present invention.
Figure 6:
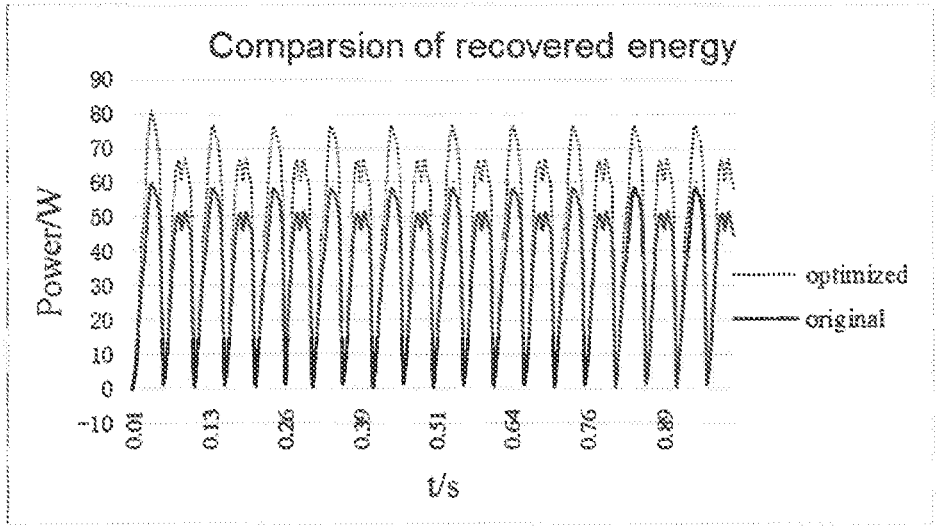
FIG. 6 compares the energy regenerative property of the hybrid excitation mechanism before and after the sizes of the hybrid excitation mechanism are optimized according to the present invention.

Comparisons vibration isolation property and energy regenerative property of the hybrid excitation mechanism before and after optimization are shown in FIG. 5 and FIG. 6, respectively. It can be seen that, after optimization, the vibration isolation property and energy regenerative property of the hybrid excitation mechanism are greatly improved, which confirms the validity of the method for determining the sizes of a damper proposed in the invention.

The specific embodiment is described in detail hereinbefore with reference to the technical solutions of the proposed invention. Referring to the technical solutions of the present invention, a person of ordinary skill in the art can propose a variety of alternative structures and embodiments. Thus, the specific embodiment and drawings described hereinbefore are merely exemplary illustration of the technical solutions of the present invention, and should not be considered as the complete contents or as limitations of the present invention.

The invention claimed is:

1. A method for determining the sizes of a damper for a semi-active energy regenerative suspension based on hybrid excitation, comprising the steps of:

Step 1), deducing an analytical expression of an electromagnetic damping force and an analytical expression of an induced electromotive force of the damper for a semi-active energy regenerative suspension;

Step 2), determining a rated data of the damper for a semi-active energy regenerative suspension according to particular working conditions and technical requirements of the damper for a semi-active energy regenerative suspension; and, determining an adjustable range of a hybrid damping force and a type of the hydraulic shock absorber;

Step 3), determining a size of a permanent magnet according to a deduced analytical expression of the electromagnetic damping force of the damper for a semi-active energy regenerative suspension, wherein an excitation current in a DC excitation winding is assumed as zero; and determining a number of windings and wire diameter of a DC excitation winding according to an input range of a DC excitation current in the DC excitation winding;

Step 4), optimizing overall dimensions of a motor by particle swarm optimization algorithm, wherein the electromagnetic damping force provided by unit excitation current is taken as an objective function, and wherein constraint conditions are as follows: magnetic density of each part of the motor does not exceed a maximum value of the magnetic density; boundary dimensions of the motor meet corresponding requirements; an excitation current is no more than 3 A; and the electromagnetic damping power is greater than the minimum value; and, substituting the above constraint conditions into the objective function with a penalty function, wherein the parameters set in the particle swarm optimization algorithm include a population size of the particle swarm, learning factors, inertia weights, an independent variable and a number of iterations;

Step 5), substituting overall dimensions of the motor obtained as described above into the analytical expression of the electromagnetic damping force and the analytical expression of the induced electromotive force so as to obtain an analytic value of the electromagnetic damping force and an analytic value of energy recovered in the damper for a semi-active energy regenerative suspension;

Step 6), comparing the rated data of step 2) and the analytic values calculated in step 5); and moving to a next step if the design requirements are met, or otherwise returning to step 3) if the design requirements are not met;

Step 7), establishing a motor model according to initial sizes of each part of the motor as determined in step 3) and step 4) in a simulation software; simulating the linear motor based on hybrid excitation, and performing a finite element analysis; and, optimizing dimensions of a hybrid excitation mechanism via comparing a finite element value with the analytic value calculated in step 4),wherein the parameters to be optimized include a width of the permanent magnet, a length of DC excitation winding and a length of an air-gap between a stator and a mover in the motor;

Step 8), obtaining optimized sizes of the hybrid excitation mechanism after being optimized; and, comparing performances of the damper for a semi-active energy regenerative suspension before and after optimization, wherein, if there is no significant improvement after optimization in term of the performances of the damper, return to step 6); and Step 9), determining final sizes of the damper for a semi-active energy regenerative suspension.

2. The method for determining the sizes of a damper for a semi-active energy regenerative suspension based on hybrid excitation according to claim 1, wherein the analytical expression of the electromagnetic damping force deduced in the step 1) is $$F_E = \frac{k_f k_v (\dot{z}_2 - \dot{z}_1)}{R_m + R_l},$$

wherein $F_E$ is the electromagnetic damping force of the damper for a semi-active energy regenerative suspension; $k_f$ is an electromagnetic damping force coefficient; $k_v$ is a voltage coefficient of winding; $(\dot{z}_2 - \dot{z}_1)$ is a relative velocity between the mover and the stator; $R_m$ is the motor internal resistance; and $R_l$ is the resistance of a loaded circuit.

3. The method for determining the sizes of a damper for a semi-active energy regenerative suspension based on hybrid excitation according to claim 1, wherein the analytical expression of the induced electromotive force deduced in the step 1) is $$V_{emf} = -m 2\pi r \frac{A_m B_m}{A_{coil}} \frac{dx}{dt} = -k_v (\dot{z}_2 - \dot{z}_1),$$

wherein $V_{emf}$ is the induced electromotive force of the damper for a semi-active energy regenerative suspension; m is a number of windings of the three-phase windings; r is a wire diameter of three-phase windings; $A_m$ is a radial section area of the permanent magnet; $A_{coil}$ is a radial section area of the three-phase windings; $B_m$ is a magnetic induction intensity of the permanent magnet; $k_v$ is a voltage coefficient of the winding; and $(\dot{z}_2 - \dot{z}_1)$ is relative velocity between the mover and the stator.

4. The method for determining the sizes of a damper for a semi-active energy regenerative suspension based on hybrid excitation according to claim 1, wherein the final sizes of the damper for a semi-active energy regenerative suspension determined by step 9) are as follows: a thickness of an iron core, $\tau_i$, equals to 5.7 mm; a thickness of the permanent magnet, $\tau_m$, equals to 10.5 mm; a width of the three-phase windings, $\tau_c$, equals to 8.4 mm; a yoke radius of the stator, $r_s$, equals to 33.55 mm; an outer diameter of the three-phase windings, $r_c$, equals to 32.2 mm; an internal diameter of the three-phase windings, $r_a$, equals to 29.2 mm; an outer diameter of the permanent magnet, $r_m$, equals to 28.2 mm; an internal diameter of the permanent magnet, $r_w$, equals to 22.2 mm; an outer diameter of the direct current excitation winding, $r_i$, equals to 19.2 mm; and an internal diameter of the direct current excitation winding, $r_p$, equals to 4.2 mm.

5. The method for determining the sizes of a damper for a semi-active energy regenerative suspension based on hybrid excitation according to claim 1, wherein parameters set in the particle swarm optimization algorithm in step 4) are as follows: population size of the particle swarm is 40; learning factors are all of 2; inertia weights are all of 0.9; independent variable is 4; and number of iterations is 500.

* * * * *